United States Patent [19]

Howard

[11] 4,152,882

[45] May 8, 1979

[54] VEGETATION CUTTING ASSEMBLY

[76] Inventor: Tyson W. Howard, 709 N. Church Ave., Mulberry, Fla. 33860

[21] Appl. No.: 720,276

[22] Filed: Sep. 3, 1976

[51] Int. Cl.² ............................................. A01D 55/18
[52] U.S. Cl. .................................... 56/13.7; 64/2 R; 64/23
[58] Field of Search ..................... 56/13.7, 16.9, 12.7, 56/295; 51/241 R; 64/1 R, 3, 4, 5, 6, 7, 23, 23.5; 30/276

[56] References Cited

U.S. PATENT DOCUMENTS

| 1,871,528 | 8/1932 | Joline | 64/2 R |
|---|---|---|---|
| 2,696,090 | 12/1954 | Harrington | 64/23 |
| 2,775,856 | 1/1957 | Hoch | 56/16.9 |
| 2,790,292 | 4/1957 | Trecker | 51/241 R |
| 3,135,132 | 6/1964 | Bratz | 64/3 X |
| 3,319,406 | 5/1967 | Miles | 56/13.7 |
| 4,020,651 | 5/1977 | Callies | 64/23 |
| 4,040,504 | 8/1977 | Smith | 64/23 X |

*Primary Examiner*—Russell R. Kinsey

[57] ABSTRACT

A cutting assembly usable in combination with a primary drive power source such as an internal combustion engine on a lawn mower, tractor or like assembly or alternately, an electrically powered hand tool or like element whereby a plurality of cutting elements defining a cutting head are remotely extendable from the power source by means of a drive cable element drivingly interconnected, through a power take-off, to the drive power source. A gear adjustment assembly is disposed in power transmitting relation between the power drive source and the plurality of cutting elements so as to regulate the rotational speed of the cutting elements during operation. The power take-off assembly is specifically configured to be adapted for either direct drive coupling relationship to a drive shaft of the power drive source or alternately, to accomplish frictional driving engagement therewith such that rotation of the cable drive element and accordingly the plurality of cutting elements may be readily accomplished with minor modification of the lawn mower, electrical tool or other power drive source used in combination with the vegetation cutting assembly.

3 Claims, 10 Drawing Figures

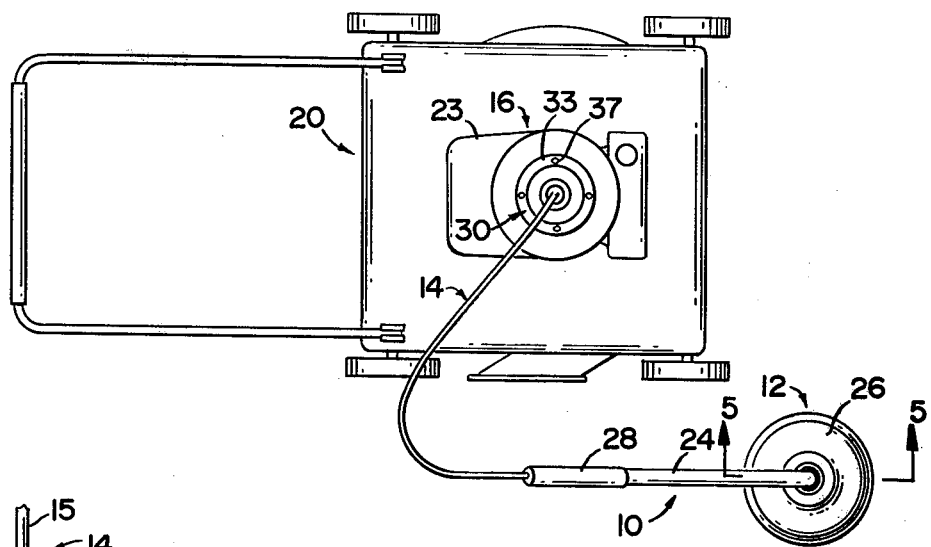
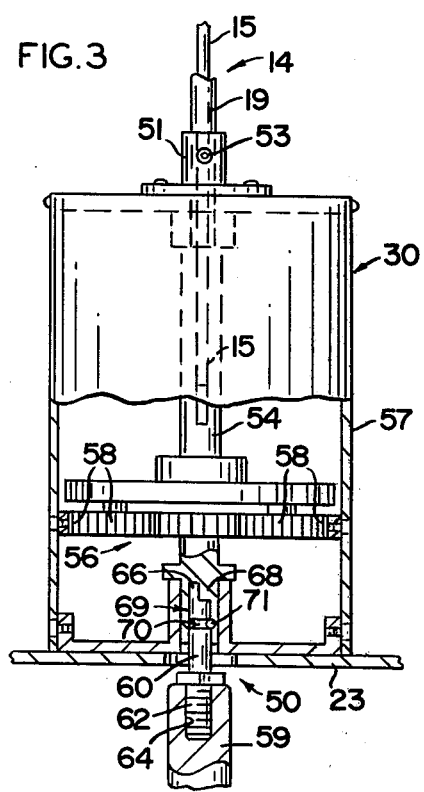
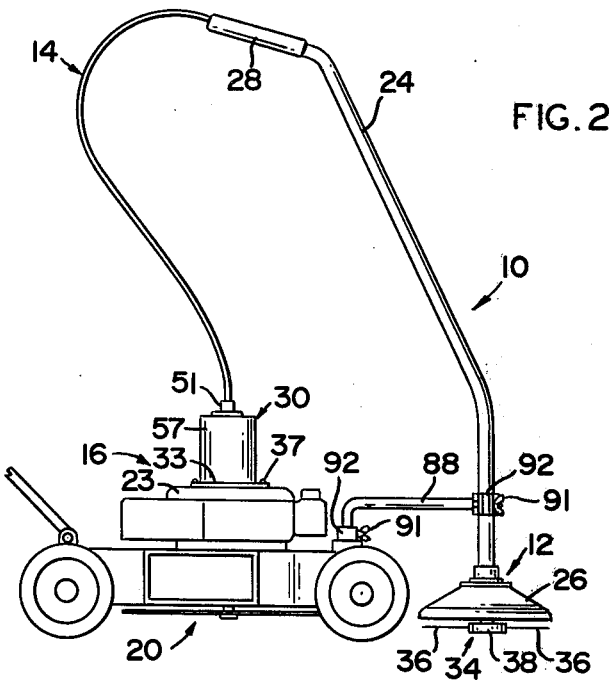
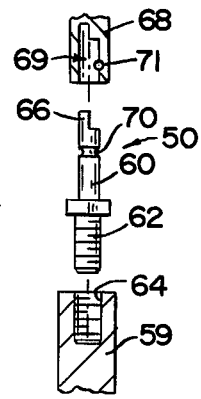
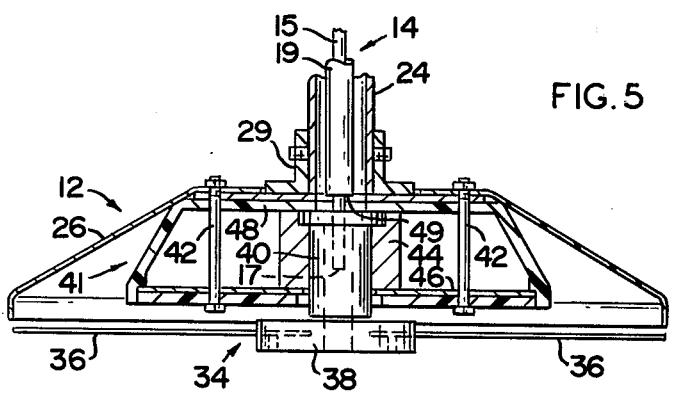

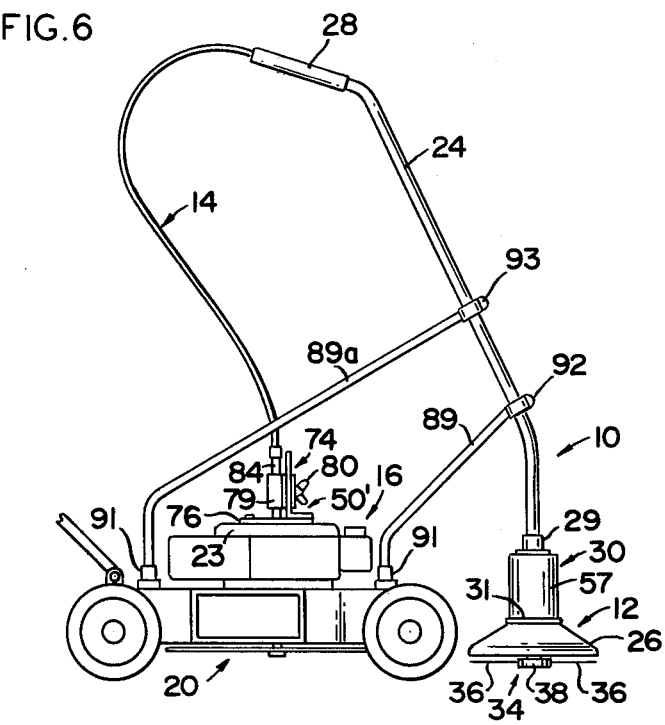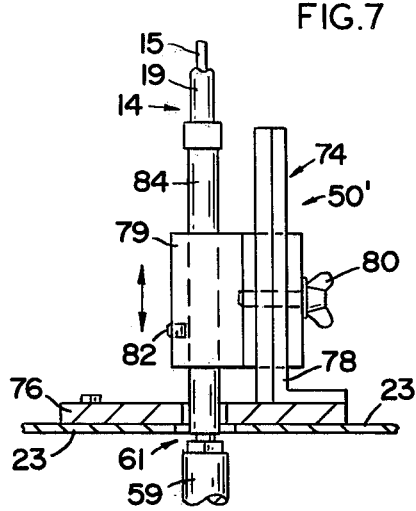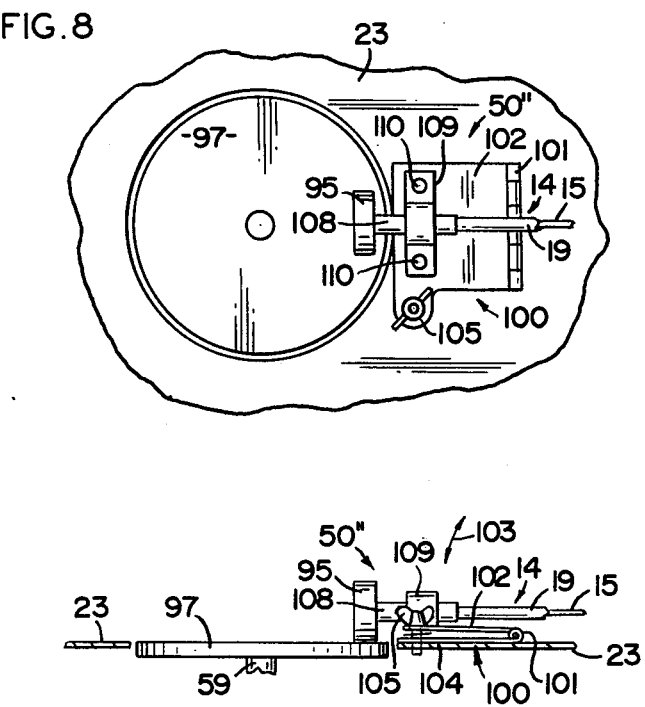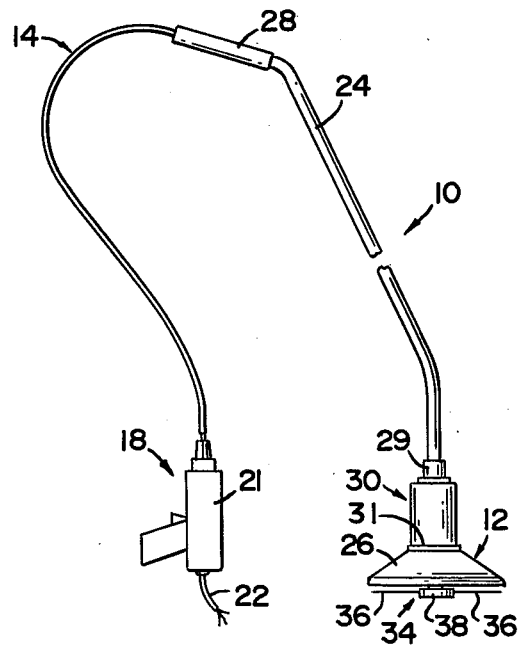

VEGETATION CUTTING ASSEMBLY

BACKGROUND OF THE INVENTION

1. Field of the Invention

A vegetation cutting assembly of the type primarily designed to be hand held and driven from a drive power source such as the internal combustion engine of a lawn mower wherein the vegetation cutting assembly can be operated to cut in substantially remote locations relative to the drive power source such as around trees, along wall edges, etc.

2. Description of the Prior Art

Various types of vegetation and agricultural cutting instruments and assemblies have been known for many years. Such instruments exist not only in the commercial, agricultural field but in the area of plant and lawn care wherein lawn cutting, trimming, etc., has seen an extreme variation in structures designed to accomplish the manicuring, etc., of lawns or like vegetation.

Power lawn mowers powered by either electric motors or internal combustion engines have also been commercially available for many years and, again, in a wide variety of designs, are extremely popular. These power lawn mowers are primarily designed to cut relatively large surface areas of lawns or like vegetation in a relatively efficient manner. Some of the larger, more powerful prior art structures are capable of being ridden and are known in the industry as "tractor-type" mowers.

Other more specialized tools or instruments are also available to perform relatively specialized cutting functions such as edging, trimming, etc.

However, even with the extremely wide variety of cutting assemblies existing in the prior art and presently commercially available, there is still a need in the area of lawn cutting or like structures which is not met by the vast majority of those products now available. More specifically, the larger hand-driven or power-driven lawn mowers are, as set forth above, designed to cut relatively large surface areas of grass or like vegetation. These structures are not designed to accomplish the cutting required in rather "close" areas such as around the base of trees, bushes, along the edges of walks or up the borderline between a vertical wall and the edge of a lawn or like vegetation. While edgers, trimmers, etc., do exist, these particular instruments are normally designed to define a clean trimline along the edges of walkways, etc., and generally define a separated space between the border of the lawn and the peripheral edge of the walkway, etc.

Accordingly, there is a great need in this particular industry for a device which is sufficiently versatile to perform the desired cutting function in a variety of "close" areas such as mentioned above which are not readily accessible by the majority of structures presently available on the commercial market. Such a structure should be relatively lightweight and accordingly be capable of hand support or manipulation without the exertion of a great deal of strength. The unit should be power operated from either an I.C. or electric motor and more importantly be capable of direct driving interconnection to substantially conventional power sources such as a lawn mower, electric hand tool or the like so that the initial expense of purchasing an entire new cutting assembly plus power supply source can be avoided.

SUMMARY OF THE INVENTION

This invention relates to a cutting assembly of the type primarily designed to be used in combination with a power drive source of substantially conventional design or of the type which encompasses a primary function other than driving the cutting assembly of the present invention. More specifically, the cutting assembly of the present invention comprises a power take-off which is specifically dimensioned and configured for power transmission and driving interconnection to a power drive source of conventional design. This power drive source may be the internal combustion engine of a power lawn mower, the electric motor of a similar type mower or other applicable type power sources such as an electric hand drill or other tool, etc. In the various embodiments of the present invention the power take-off means is specifically adapted in its structural design to be drivingly interconnected to the drive shaft or power take-off shaft associated with the power drive source. This is true whether it be in the form of an internal combustion engine or an electric motor. A drive cable element is disposed in substantially power transmitting and driven relation between the power take-off and a cutting head. The drive cable has an elongated configuration of a predetermined length so as to allow remote operation of the cutting head assembly and in particular positioning of the cutting head assembly into areas not otherwise obtainable by conventional cutting structures. The drive cable is maintained within a sleeve or sheath of substantially conventional design wherein the inner drive cable is maintained in constant rotary, driving relation by virtue of its secure attachment to the power take-off means. The opposite end of the drive cable is connected to the cutting head.

The cutting head itself comprises a drive spool having fixedly attached thereto a mounting disc with a plurality of cutting elements extending outwardly therefrom. The drive cable is secured to the drive spool of the cutting head and causes its rotary motion at predetermined speeds.

The cutting elements themselves comprise a plurality of substantially elongated, wire-like elements made from a substantially semi-ridged material and disposed in diametrically opposed relation to one another about the periphery of the cutting disc. In the preferred embodiment, the plurality of cutting elements comprises only two wire-like elements again disposed in diametrically opposed relation to one another on opposite portions of the cutting disc. This specific disposition allows for a counterbalanced relation to one another during the relatively high speed rotation of the cutting spool and accompanying mounting disc. As set forth above, and again in the preferred embodiment, the cutting elements are made from a semi-ridged material. By the term "semi-ridged" it is herein meant to describe the wire-like elements as being capable of being somewhat bent or flexed so as to be capable of "giving" when encountering an obstacle like a rock, etc., which is not intended for cutting. However, "semi-ridged" is also meant to include a sufficient amount of rigidity to be inherently maintainable along its length in its original fixed shape when no external force is being placed thereon.

Another structural feature of the present invention comprises the provision of a gear adjustment means in the form of a gear casing disposed and configured to house a plurality of individual gear elements. The gear adjustment means is disposed somewhere along the power train between the power take-off and the cutting head or cutting elements. The gear adjustment means may take the form of a gear graduation means whereby the actual speed of rotation of the cutting elements is increased from that of the drive shaft of the power drive source (internal combustion engine, etc.). Placement of the gear adjustment means is dependent upon the particular embodiment of the invention desired. More specifically, the gear adjustment means may be placed immediately adjacent and in driving intercommunication with the power take-off as the power take-off delivers the rotational force from the power drive source directly thereto. Alternately, the gear adjustment means may be placed immediately adjacent the cutting head so as to be disposed in intercommunicating and power transmitting relation between the drive cable and the drive spool of the cutting head.

Another embodiment of the present invention comprises the provision of auxiliary cutting tools such as hedgers, clippers, edgers, etc., which may be also drivingly attached to the drive cable element. In this particular embodiment the gear adjustment means may serve as a gear reduction assembly serving to reduce the actual rotating speed of the cable drive element as it transmits power to the auxiliary cutting tool. Alternately, a direct drive ratio may be provided through the deletion of the gear adjustment means entirely when the driving speed of the auxiliary tool is substantially equivalent to the drive shaft of the power source.

Depending on the particular embodiments of the present invention, the power take-off means may include alternate structural designs. Such structural configurations of the power take-off means include a direct drive coupling between the drive shaft of the power drive source and the receiving socket which may be drivingly connected to either the drive cable itself or to the gear adjustment means, dependent on the particular embodiment of the present invention utilized. Other forms of the power take-off means include frictional drive whereby a drive disc is specifically disposed into driving, frictional engagement with a power take-off portion of the drive source itself such that rotational driving force is transmitted directly to the disc which in turn is transmitted to the other elements of the vegetation cutting assembly which defines the power train thereon.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a top view of the cutting assembly of the present invention attached to a substantially conventional power drive source.

FIG. 2 is a side view showing means of operatively supporting the cutting assembly on the casing of a power drive source or lawn mower.

FIG. 3 is an enlarged elevational view with portions broken away and shown in section, showing the interior of the gear adjustment assembly and its driving interconnection to a power take-off means.

FIG. 4 is a partial, exploded view, in section, showing the relative cooperative structural features of one embodiment of the power take-off means.

FIG. 5 is an enlarged sectional view taken along line 5—5 of FIG. 1 showing the interior of the cutting head of the present invention.

FIG. 6 is a side view showing another embodiment of the power take-off means and location of the gear adjustment means adjacent the cutting head.

FIG. 7 is an enlarged view of the power take-off means shown in FIG. 6.

FIG. 8 is a top, partial cutaway view showing yet another embodiment of the power take-off means of the present invention.

FIG. 9 is a side view, in partial section, of the embodiment shown in FIG. 8.

FIG. 10 is a side view showing the cutting assembly of the present invention used in combination with a power drive source in the form of an electrically operated tool.

Similar reference characters refer to similar parts throughout the several views of the drawings.

DETAILED DESCRIPTION

As best shown in FIGS. 1, 2, 6 and 10, the vegetation cutting assembly of the present invention is generally indicated as 10 and comprises a cutting head 12 connected in driven relation to one end of a cable drive element 14. The opposite end of the cable drive element 14 is drivingly interconnected to a power drive source generally indicated as 16 in FIGS. 1, 2 and 6 and as 18 in FIG. 10. More particularly, the power drive source may comprise an internal combustion engine or the like of the type normally found in driving relation to a lawn mower assembly generally indicated as 20. The specific capacity and structural features of the internal combustion engine 16 are not, per se, intended to be maintained within the scope of the present invention. However, the vegetation cutting assembly is designed to be used in combination with a portable type power drive source of the type which will allow mobility of the cutting assembly 10.

In the embodiment of FIG. 10, it is shown that the power drive source 18 may be in the form of an electrically powered hand tool such as a drill or the like 21 interconnected to a permanent or like electrical supply through electrical conduit 22.

An elongated arm 24 is disposed in fixed, interconnecting relation to the casing 26 of the cutting head 12. The arm 24 has a substantially hollow interior so as to house the cable drive element 14 as shown. A handle portion 28 is disposed generally at one end thereof and the arm itself is made from a metallic, plastic or generally lightweight but rigid material sufficient to support the head 12 at the opposite end thereof and position it in a desired location relative to the vegetation to be cut. In the embodiment shown in FIGS. 6 and 10, the arm 24 is fixedly attached by means of connecting collar 29 to a gear reduction means generally indicated as 30. In these embodiments, therefore, rather than the arm 24 being directly attached to the housing or casing 26 of the cutting head 12 it is attached in fixed, supported relation to the gear adjustment assembly 30 which in turn is joined to the casing as at connecting ring 31 to the casing or housing 26. The details of the gear adjustment means 30 will be explained in greater detail hereinafter.

Further in regard to the cutting head, reference is made to FIG. 5 wherein the outer or protective casing 26 is disposed to substantially overlap or overhang in protective relation thereto. The cutting means itself generally indicated as 34 comprises a plurality of cutting elements 36 fixedly attached to the mounting disc 38 which in turn is fixedly attached to the drive spool 40 so as to rotate therewith. The individual cutting elements 36 comprise wire-like elements which are disposed on the disc 38 in substantially diametrically opposed relation to one another so as to provide a counterbalanced effect during the relatively high speed rotation of the mounting disc 38. A support assembly generally indicated as 41 is provided on the interior of the casing or housing 26. The support assembly 41 is attached to casing 26 by substantially conventional connector elements 42 wherein outer sleeve bushing 44 serves to separate the base portion 46 from mounting bracket 48 all of the support assembly and to retain cylinder 40 in its proper place. A connecting collar 29 serves to interconnect casing 26 directly to the arm 24 in a similar manner as pointed out with reference to FIG. 10.

Again with reference to FIG. 5, the interconnection between the drive cable element 14 and the drive cylinder 40 comprises the inner cable 15 being securely attached as at 17 to the cylinder 40 and basically on the interior thereof. The outer protective sheath 19 of the cable drive element 14 passes through the interior of the arm 24 and on the exterior of the inner drive cable 15 to a point substantially adjacent the mounting bracket 48 as at 49. The distal end of the drive cable element 14 may be directly connected to the cutting means 34 as represented in FIG. 5. Alternately, it may be interconnected to the gear adjustment means 30 as represented in FIGS. 6 and 10.

In yet another embodiment of the present invention (FIGS. 1, 2 and 3), the gear adjustment means 30 is disposed in power transmitting relation between a power take-off means 50 and the leading end of the drive cable 14 substantially opposite to that end associated with the cutting head 12. With reference to FIG. 3, the drive cable element 14 is interconnected to the gear adjustment means 30 by a connector collar 51 secured by conventional set screw 53. The inner cable drive element 15 is disposed substantially on the interior and fixed to a gear adjustment drive shaft 54 so as to rotate therewith. Gear assembly generally indicated as 56 is also disposed on the interior of the casing 57 of the gear adjustment means 30 and comprises a plurality of gear elements 58 each having a predetermined disposition and configuration and brought into mating engagement with one another so as to cause a gear graduation between the rotation of the drive shaft 59 of the drive power source 16 and the inner cable element 15 leading to the cutting head. The ultimate desire is the regulation of the rotational speed of the cutting elements 36. Accordingly, the gear adjustment means 30 is disposed in the gear train in power transmitting regulation between the power drive source 16 or more particularly the drive shaft 59 thereof and the cutting means 34.

With reference to FIGS. 3 and 4, the power take-off means of the present invention is generally indicated as 50 and comprises, in one embodiment, a drive coupling assembly including a drive element 60 having one end 62 formed into a reverse threaded connection for mating engagement with the appropriately threaded receiving portion 64 of the drive shaft 59 of the power drive source 16. The opposite end of the drive element 60 comprises a direct coupling element including an extending finger 66 configured and disposed to engage in the guide socket 68 as at 69. The specific configuration of these direct coupling elements may vary but generally comprise a male and female portion which may be reversably interchanged but in any event form a direct locking, mating engagement with one another so as to cause firm direct rotational motion of the inner locking members thereby serving as a direct means of power transmission. A quick disconnect coupling may be in the form of an annular groove 70 disposed to engage snap ring element 71 formed on the drive element 60 and in the drive socket 68 as shown in FIG. 4. With reference to FIG. 3, the interconnection of the various structural elements described in FIG. 4 is shown in assembled fashion such that power is transmitted from the rotational force exerted by drive shaft 59 onto the drive element 60 through the drive socket 68 and into the gear adjustment means 30. From there the power transmission is rotatably transferred to the inner drive cable element 15 and eventually to the cutting head.

In this embodiment a support clamp arm 88 may be affixed to the mower or like structure 20 so as to support the vegetation cutting assembly 10 in an outboard or substantially remote location from the casing 23 as shown. It should be noted that the clamp arm 88 may be either substantially rigid or flexible so as to provide proper manipulative versatility in the placement of the cutting assembly as desired. Attachment may occur through conventional connector elements 91 and connecting bushings or collar 92 disposed at either or both ends of the clamp arm 88.

With reference to FIG. 7, yet another embodiment of the present invention comprises the provision of a mounting bracket generally indicated as 74 being disposed in supported relation onto housing 23 of the mower or like element 20 by means of support plate 76. The support bracket 74 comprises, in one embodiment, an L-shaped configuration and its upstanding leg 78 as shown in FIG. 7 and is disposed to interconnect to a support block 79 be means of a thumb type screw connector 80 or the like. Set screw 82 again serves to secure protective covering or sleeve 84 about protective sheath 19 of the cable drive element 14 whereby inner drive cable 15 is interconnected in driven relation to the take-off as at 61 to the drive shaft 59 of the power drive source 16.

This embodiment of the power take-off is particularly adaptable to the embodiment shown in FIG. 6 wherein the power take-off generally indicated as 50' serves to connect the cable drive 14 directly to the drive shaft 59 of the power drive source 16 in an upstanding relation and off the top thereof. Also in this embodiment a plurality of support clamp arms 89 and 89a may be affixed to the housing 23 of the mower or like structure 20 so as to support the vegetation cutting assembly 10 in an outboard or substantially remote location from the casing 23 as shown. It should be noted that the clamp arms 89 and 89a may be either substantially rigid or flexible so as to provide proper manipulative versatility in the placement of the cutting assembly as desired. Attachment may occur again through conventional connector elements 91 and connecting bushings or collar 92 disposed at either or both ends of the clamp arms 89 or 89a. Alternately, a quick disconnect snap mount generally indicated as 93 may be provided so as to facilitate the removal of the arm 24 from the clamp arms 89 or 89a when it is desired to arrange for placement of the cutting head in a hard to reach position not accessible to the larger mower 20 itself. With reference to FIGS. 8 and 9, yet another embodiment 50″ of the power take-off is provided. As shown this embodiment is in the form of a friction drive arrangement wherein friction disc 95 is disposable into frictional, moving engagement with a take-off portion or plate element 97 attached to the drive shaft 59 from the power drive source. Mounting bracket 100 comprises a pivot connection at 101 serving to allow pivotal or rotational movement of the support plate 102 in the direction indicated by directional arrow 103 so as to bring the frictional driving disc 95 into and out of engagement with the driving substantially planar surface of the take-off plate 97. As is readily apparent the rotation of shaft 59 causes the rotation in turn of the take-off plate 97. When the peripheral portion of the friction disc 95 is in direct engagement therewith power is, of course, transmitted to the inner drive cable 15 of the cable drive element 14. Displacement of this frictional drive out of driven relation with the take-off 97 is readily accomplished by the manipulation of the thumb screw 105 and movement of the top plate 102 relative to the base plate 104 as indicated. The protective arm or sheath 108 is mounted in a support bracket as at 109 and this support bracket is secured to the top plate 102 by conventional connectors 110.

With reference to FIGS. 1 and 2, the gear adjustment means 30 may be mounted in the upright substantially vertical position so as to be drivingly engaged by the power take-off stemming through the top of the housing 23 of the lawn mower or power drive source 16. This mounting of the gear adjustment 30 is accomplished by a mounting annulus 33 through a plurality of connector elements 37.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A vegetation cutting assembly of the type primarily designed to be driven from a lawn mower having a power drive source and operated at a substantially remote location therefrom, said cutting assembly comprising: power take-off means disposed in driven relation to the power drive source; a cutting head drivingly interconnected to said power take-off means; drive cable means disposed in drivingly interconnected relationship between the power source and said cutting head; and gear adjustment means disposed in power transmitting relation between said power take-off and said drive cable, said gear adjustment means comprising a gear assembly whereby said drive cable is driven at a different rotational speed from said power take-off; said drive cable comprising an elongated flexible configuration being attached in driven relationship at one end thereof to said gear adjustment means and being drivingly attached at the opposite end thereof to said cutting head, said power take-off means comprising a drive coupling assembly, said drive coupling assembly including a drive element, one end of said element being threadedly connected to the drive shaft of the power drive source and the opposite end of said element being matingly attached in locking engagement with a drive socket element, said drive socket element being correspondingly configured as said opposite end and said drive socket element comprising a portion of said power take-off means, whereby said drive element is disposed in interconnected relation between the drive shaft of the power drive source and said drive cable, said cutting head including a plurality of cutting elements each formed from a semi-rigid material and disposed on said cutting head in diametrically opposed relationship to at least one other of said plurality of cutting elements, whereby a counter balance relationship exists between oppositely disposed pairs of said plurality of cutting elements.

2. A vegetation cutting assembly as in claim 1 wherein said drive socket element is disposed in driving relation to said cable drive element and being defined at least in part by a female portion, said female portion being configured to matingly receive a correspondingly configured male portion of said drive element.

3. A vegetation cutting assembly as in claim 1 further comprising clamp means secured to said lawn mower and disposed to removably support said cutting head in outward spaced relation to said lawn mower.

* * * * *